No. 727,321. PATENTED MAY 5, 1903.
I. ERSHA.
STRAINER.
APPLICATION FILED NOV. 29, 1902.
NO MODEL.

Witnesses
Harry L. Ames
Chas. S. Hoyer

Inventor
Ingre Ersha
By Victor J. Evans
Attorney

No. 727,321. Patented May 5, 1903.

UNITED STATES PATENT OFFICE.

INGRE ERSHA, OF PAINTED WOODS, NORTH DAKOTA.

STRAINER.

SPECIFICATION forming part of Letters Patent No. 727,321, dated May 5, 1903.

Application filed November 29, 1902. Serial No. 133,240. (No model.)

*To all whom it may concern:*

Be it known that I, INGRE ERSHA, a citizen of the United States, residing at Painted Woods, in the county of Burleigh and State of North Dakota, have invented certain new and useful Improvements in Strainers, of which the following is a specification.

This invention relates to a detachable strainer for tea or coffee pots; and the primary object of the same is to provide a simple and effective device of this class having means whereby it will be reliably held in fixed position in connection with the pouring-spout of a coffee or tea pot and permit a cup and saucer to be in one hand while tilting the coffee or tea pot with the other hand to effect an exit of the tea or coffee through the pouring-spout; also to produce a strainer for a coffee or tea pot which is adapted to fit any size of spout and be frictionally held in positive relation to the latter, it being unnecessary to remove the strainer except for cleaning purposes, and also to cheapen the cost of manufacture of strainer attachments, as well as increase their strength and durability.

With these and other objects and advantages in view the invention consists in the construction and arrangement of the several parts, which will be more fully hereinafter described and claimed.

Figure 1:
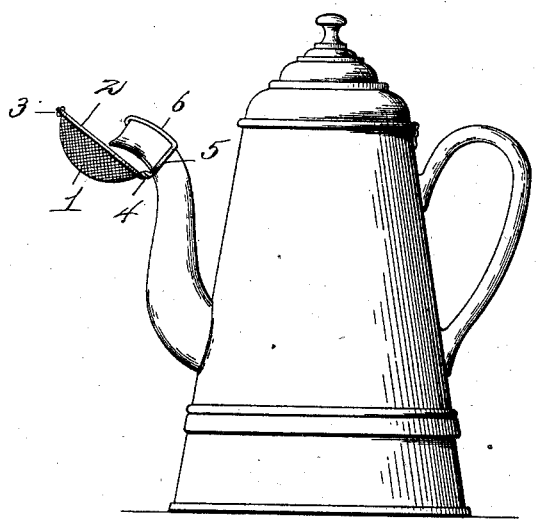
Figure 2:
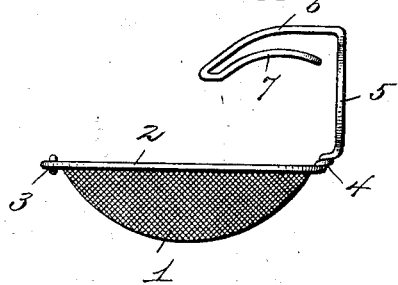
Figure 3:
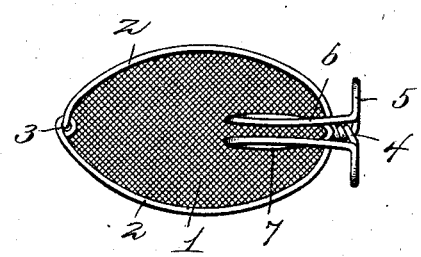
Figure 4:
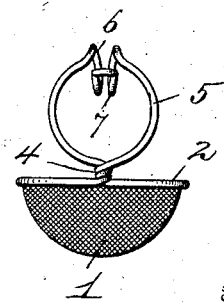

In the drawings, Figure 1 is a side elevation of a coffee-pot, showing a strainer applied thereto in operative position and embodying the features of the invention. Fig. 2 is a detail side elevation of the improved strainer. Fig. 3 is a top plan view of the same. Fig. 4 is a rear elevation thereof.

Similar numerals of reference are employed to indicate corresponding parts in the several views.

The improved strainer comprises the usual wire-gauze straining-body 1, which may be of any size and proportionate to that of the remaining structural features of the strainer. This straining-body is attached to an elliptical rim-frame 2 and is therefore approximately of egg shape, though it will be understood that other contours may be adopted at will. The rim-frame 2 is an integral or continuous part of the salient feature of the improvement, which is the formation of said frame and the securing member of a single piece of wire of resilient nature, the two ends of the wire being interlocked, as at 3, at the outer end or extremity of the strainer structure. At a diametrically opposite point the extremities of the wire, which are bent into shape to form the rim-frame 2, are interlocked by twisting to provide a securing-neck 4, and the two portions of the wire from the said neck are bent outwardly in opposite lateral directions and disposed in a vertical plane to form an approximate ring or yielding clamp 5. From the upper extremity of the said yielding ring or clamp 5 the portions of the wire are bent forwardly and downwardly over the central portion of the strainer-body below in a partial curved plane to produce a bearing extension 6, and from the lower terminal of the said extension the wire is then bent backwardly and under said extension to provide a securing-tongue 7.

In applying the improved strainer the outer free end of the pouring-spout of a coffee or tea pot is inserted through the resilient ring or clamping member 5, and the tongue 7 enters the opening of the said spout, the distance between the tongue 7 and extension 6 being such as to set up a frictional securement in relation to the free extremity of the spout, which combined with the circumferential frictional bite of the ring or clamping member 5 on the said spout will prevent the strainer from becoming loose and accidentally detached from the spout. One of the advantages of the present construction is that the bearing extension 6 being composed of two spaced members will set up two contacts with the upper portion of the free extremity of the spout, which combined with the tongue 7 of loop form prevents the strainer from moving laterally. When the strainer is applied to the outer extremity of the spout, the rim-frame 2 will be disposed at an upward angle of inclination, as clearly shown by Fig. 1, and always be in position to effectively strain the contents of the pot issuing from the spout. The main advantage of the present improved form of strainer is that it will always remain in immovable relation to the outer extremity of the spout until manually withdrawn, and hence will not become lost or slip from its place, it only being necessary to detach the strainer to cleanse the same. The distance between the tongue 7 and the bearing extension 6 will be primarily predetermined to adapt the strainer to be effectively applied to any size strainer or spout, and in view of the fact that the ring or clamping member 5 can expand automatically to fit over spouts having varying diameters the improved strainer is adapted to be applied to any coffee or tea pot spout.

The rim-frame 2 and members continuous therewith may be suitably plated or ornamented, and in view of the fact that the said rim-frame and members are composed of a single piece of material the cost of manufacture will be reduced to a minimum.

Having thus fully described the invention, what is claimed as new is—

1. A strainer for the purpose set forth comprising a strainer-body, and a rim-frame to which the strainer-body is secured having an upwardly-projecting yielding clamping-ring continuous therewith, a forward extension projecting from the upper portion of the clamping-ring and a rearwardly-bent tongue under the extension.

2. In a strainer of the class set forth, the combination of a strainer-body, and a rim-frame, yielding clamping-ring, bearing extension projecting from the upper portion of said ring, and a tongue under the extension, the frame, clamping-ring, extension and tongue being formed from a single piece of material.

3. A strainer of the class set forth comprising a strainer-body, and a rim-frame to which said body is secured having a yielding clamping-ring in a plane at right angles to one extremity thereof provided with forwardly and rearwardly extending securing means at the upper portion thereof.

In testimony whereof I affix my signature in presence of two witnesses.

INGRE ERSHA.

Witnesses:
SIMON JAHR,
P. K. EASTMAN.